(12) United States Patent
Okamoto et al.

(10) Patent No.: US 9,933,691 B2
(45) Date of Patent: Apr. 3, 2018

(54) IMAGING DEVICE

(71) Applicant: PANASONIC INTELLECTUAL PROPERTY MANAGEMENT CO., LTD., Osaka (JP)

(72) Inventors: Katsuya Okamoto, Fukuoka (JP); Futoshi Deguchi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/646,488

(22) Filed: Jul. 11, 2017

(65) Prior Publication Data

US 2017/0307964 A1 Oct. 26, 2017

Related U.S. Application Data

(63) Continuation of application No. PCT/JP2016/000182, filed on Jan. 15, 2016.

(30) Foreign Application Priority Data

Jan. 26, 2015 (JP) .................................. 2015-012569

(51) Int. Cl.
  *G03B 17/56* (2006.01)
  *H02J 17/00* (2006.01)
  *H02J 50/10* (2016.01)

(52) U.S. Cl.
  CPC ............ *G03B 17/561* (2013.01); *H02J 50/10* (2016.02)

(58) Field of Classification Search
  None
  See application file for complete search history.

(56) References Cited

U.S. PATENT DOCUMENTS

| | | | | |
|---|---|---|---|---|
| 2003/0216233 | A1* | 11/2003 | Chen | A63B 22/14 482/147 |
| 2009/0073388 | A1* | 3/2009 | Dumm | F16M 11/10 352/243 |
| 2010/0295378 | A1* | 11/2010 | Suzuki | H02J 7/025 307/104 |
| 2012/0013293 | A1* | 1/2012 | Chu | H02J 7/025 320/108 |

(Continued)

FOREIGN PATENT DOCUMENTS

| | | |
|---|---|---|
| JP | 06-78185 | 3/1994 |
| JP | 10-276940 | 10/1998 |

(Continued)

OTHER PUBLICATIONS

International Search Report issued in International Patent Application No. PCT/JP2016/000182, dated Mar. 22, 2016, along with English-language translation.

*Primary Examiner* — W B Perkey
(74) *Attorney, Agent, or Firm* — Greenblum & Bernstein, P.L.C.

(57) ABSTRACT

An imaging device has a bearing that has a first ring and a second ring, a first plate that is disposed on one side of the bearing and fixed to the first ring, an imaging unit that is disposed on a side of the first plate, a second plate that is disposed on another side of the bearing and fixed to the second ring, a first inductor that is accommodated in the first plate, and a second inductor that faces the first inductor and is accommodated in the second plate.

10 Claims, 14 Drawing Sheets

(56) References Cited

U.S. PATENT DOCUMENTS

2015/0280447 A1 10/2015 Akuzawa et al.
2017/0104951 A1* 4/2017 Wada ..................... H04N 5/38
2017/0153532 A1* 6/2017 Le ........................ G03B 17/561
2017/0307964 A1* 10/2017 Okamoto ................ H02J 50/10

FOREIGN PATENT DOCUMENTS

| JP | 2008-243985 | 10/2008 |
| JP | 2009-200750 | 9/2009 |
| JP | 2014-90648 | 5/2014 |

* cited by examiner

IMAGING DEVICE

BACKGROUND

1. Technical Field

The present disclosure relates to an imaging device to which power is contactlessly transferred.

2. Description of the Related Art

In the related art, a slip ring having a mechanical contact is used in the case of supplying power to a load device via a mechanistic rotating object. An annular ring to which a transmission side power source circuit is connected is disposed on an outer circumferential surface of the rotating object of the slip ring, and a brush to which a reception side power source circuit is connected is in sliding contact with the outer circumferential surface of the ring. This configuration enables power from the transmission side power source circuit to be transferred to the reception side power source circuit with a rotating unit interposed between the transmission side power source circuit and the reception side power source circuit. The slip ring has degradation by wear at a contact between the ring as the mechanical contact and the brush. Thus, a problem arises in that the degradation by wear limits a lifetime of a power transfer system.

Therefore, suggested is a multiple operating unit transfer system using wireless power transfer that can realize a contactless multiple power transfer function using the slip ring (refer to, for example, PTL 1). The multiple operating unit transfer system of PTL 1 uses wireless power transfer via a rotating object and includes a primary transmission power source that supplies power, a transmitting and receiving unit that is configured of a plurality of transmitting antennas wirelessly transferring the power from the primary transmission power source and a plurality of receiving antennas receiving the power from the transmitting antennas, a plurality of transmission power source circuits that establishes a resonance condition for the transmitting antennas, and a plurality of reception power source circuits that establishes a resonance condition for the receiving antennas.

Each of the transmitting antennas is configured of a transmission side coil and a transmission side spacer. The transmission side coil is disposed to have a center approximately at an axial center of the rotating object or disposed around the axial center. The transmission side spacer has a predetermined magnetic permeability and is disposed to have a center approximately at an axial center of the transmission side coil in order to control, for each transmitting antenna, a magnetic flux of the transmission side coil. Each of the receiving antennas includes a reception side coil and a reception side spacer in the same form as the form of arrangement of the transmission side coil. The reception side coil is disposed to have a center approximately at the axial center of the rotating object or disposed around the axial center. The reception side spacer has a predetermined magnetic permeability and is disposed to have a center approximately at an axial center of the reception side coil in order to control a magnetic flux of the reception side coil. According to this multiple operating unit transfer system, the contactless multiple power transfer function using the slip ring can be realized.

CITATION LIST

Patent Literature

PTL 1: Japanese Patent Unexamined Publication No. 2014-90648

SUMMARY

An imaging device of the present disclosure includes a bearing that has a first ring and a second ring, a first plate that is disposed on one side of the bearing and fixed to the first ring, an imaging unit that is disposed on a side of the first plate, a second plate that is disposed on another side of the bearing and fixed to the second ring, a first inductor that is accommodated in the first plate, and a second inductor that faces the first inductor and is accommodated in the second plate.

DETAILED DESCRIPTION

A problem in the technology of the related art will be briefly described before description of exemplary embodiments of the present disclosure. A PTZ monitoring camera that enables each movement of a pan which is a swing in a horizontal direction, a tilt which is driving of the PTZ monitoring camera in a vertical direction, and a zoom process (pan, tilt, and zoom (PTZ) movements) is known as an imaging device. This kind of monitoring camera is endlessly swung frequently for monitoring and thus uses a slip ring having a mechanical contact. Therefore, the monitoring camera has a problem of a limited number of movements due to the mechanical contact. In addition, the weight of the PTZ monitoring camera is high because an imaging unit that is rotationally panned includes a camera, a camera control unit, a tilt mechanism, a tilt motor, a zoom mechanism, a zoom motor, and the like. Thus, for imaging devices such as the PTZ monitoring camera using a rotary driving mechanism, there is need for development of a mechanism that supports a power transmitting coil and a power receiving coil having a gap allowing power transmission interposed therebetween in a manner allowing relative rotation therebetween. That is, a problem is how to maintain the gap drawn in FIG. 2 (not illustrated) of above PTL 1.

An object of the present disclosure is to provide an imaging device that resolves a problem of a limited number of movements due to a mechanical contact and supports a power transmitting coil and a power receiving coil having a gap allowing power transmission interposed therebetween in a manner allowing relative rotation therebetween.

Hereinafter, each of the exemplary embodiments in which the imaging device according to the present disclosure is specifically disclosed will be described with reference to the drawings. In the imaging device of each of the following exemplary embodiments, a mechanism that supports the power transmitting coil and the power receiving coil having a gap allowing power transmission interposed therebetween in a manner allowing relative rotation therebetween will be referred to as a "contactless power transmission rotating mechanism". Each of the following exemplary embodiments will illustratively describe a monitoring camera as one example of the imaging device according to the present disclosure.

FIRST EXEMPLARY EMBODIMENT

Figure 1:
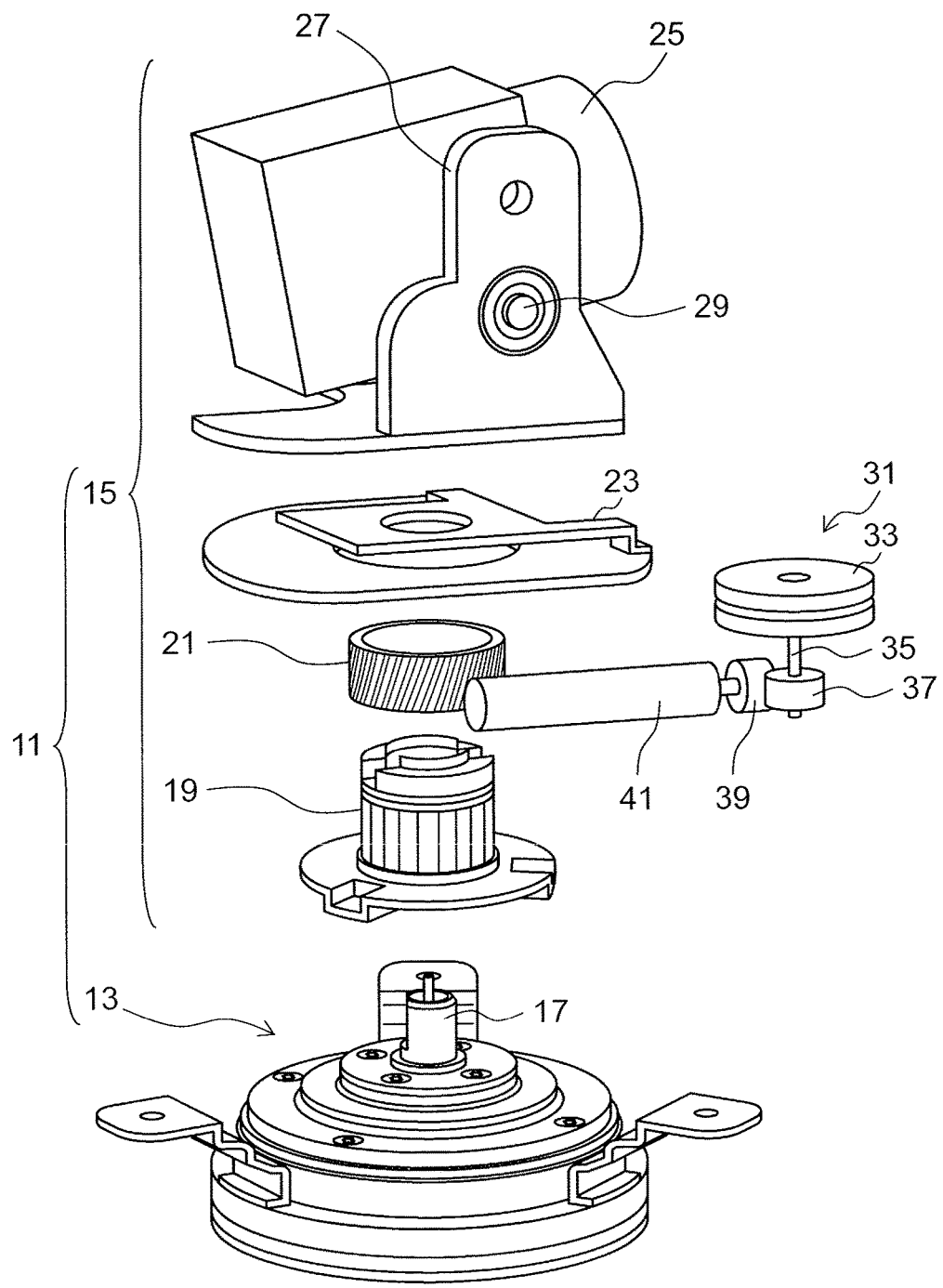
FIG. 1 is an exploded perspective view of an imaging device according to a first exemplary embodiment.

FIG. 1 is an exploded perspective view of monitoring camera 11 according to a first exemplary embodiment. Monitoring camera 11 illustrated in FIG. 1 is configured to include contactless power transmission rotating mechanism 13 and rotating unit 15. Contactless power transmission rotating mechanism 13 is fixed to a camera pedestal (not illustrated) with a main body base (not illustrated) as a device main body side interposed therebetween. Contactless power transmission rotating mechanism 13 fixed to the device main body side is connected to rotating unit 15 by shaft 17.

Rotating unit 15 has rotating shaft 19, worm wheel 21, camera bracket 23, and camera 25 as one example of an imaging unit. Shaft 17 of contactless power transmission rotating mechanism 13 is connected to rotating shaft 19 in a manner not allowing relative rotation. Worm wheel 21 is coaxially fixed to rotating shaft 19. Camera bracket 23 is fixed to rotating shaft 19. Camera bracket 23 supports camera 25. Camera 25 is supported by camera bracket 23 while being rotatable about arm spindle 29 by tilt arm 27. A tilt rotation motor (not illustrated) that rotates camera 25 in a tilt direction (an axial direction that is orthogonal with respect to a vertical axis) about arm spindle 29 is disposed in camera 25. In addition, a zoom process motor (not illustrated) for moving a lens is disposed in camera 25.

Rotating shaft 19 that is integrally fixed with worm wheel 21, camera bracket 23, and camera 25 in rotating unit 15 is fixed to shaft 17 of contactless power transmission rotating mechanism 13 in a manner not allowing relative rotation. That is, rotating unit 15 rotates with shaft 17. Rotating unit 15 is rotationally driven in a regular or reverse direction by rotary drive unit 31 fixed to the device main body side. That is, shaft 17 of contactless power transmission rotating mechanism 13 is subjected to rotation following rotation of rotating unit 15 (rotates in conjunction with rotating unit 15). Rotary drive unit 31 is configured of pan motor 33 fixed to the device main body side, pinion 37 fixed to motor drive shaft 35, intermediate gear 39 meshing with pinion 37, and worm gear 41 coaxially fixed to intermediate gear 39. Worm gear 41 meshes with worm wheel 21 of rotating unit 15. If pan motor 33 fixed to the device main body side is driven, worm gear 41 is rotated by pinion 37 with intermediate gear 39 interposed therebetween. Worm gear 41, by rotating worm wheel 21, drives rotating unit 15 (that is, camera 25) fixed to shaft 17 in a swinging manner (that is, rotation in a pan direction). The above plurality of motors enables swing (rotational pan), tilt, and zoom movements (pan, tilt, and zoom (PTZ) movements) of camera 25.

In rotating unit 15, rotating shaft 19 may be rotatably supported by the main body base. In this case, inner races of at least one pair of angular contact ball bearings are fixed to an outer circumference of rotating shaft 19. Outer races of the one pair of angular contact ball bearings are fixed to the main body base. Arranging two or more of the angular contact ball bearings in a facing manner in a back-to-back arrangement or a face-to-face arrangement can bear bidirectional thrust load in one direction and another direction. Monitoring camera 11, when being in operation, may be attached to a ceiling or may be installed on a horizontal surface. That is, a direction of gravity that is upside down works in camera 25. By attaching rotating shaft 19 to the main body base with the one pair of angular contact ball bearings in a back-to-back arrangement or a face-to-face arrangement, rotating unit 15 can bear upward and downward forces applied to camera 25. Accordingly, monitoring camera 11, whether being attached in a regular direction or a reversed direction, can support camera 25 having a high weight in a manner allowing rotation with high strength, high accuracy, and low friction.

It is preferable that rotating shaft 19 of rotating unit 15 and shaft 17 of contactless power transmission rotating mechanism 13 be connected by, for example, a spline in a manner not allowing relative rotation and allowing movement in a direction of an axial center thereof. Accordingly, by sliding of the spline or the like, displacement of the direction of the axial center by an impact or the like exerted on rotating unit 15 having a high mass is unlikely to be transmitted to contactless power transmission rotating mechanism 13. Consequently, monitoring camera 11 can effectively reduce variations (expansions and contractions) in the gap due to external interference in contactless power transmission rotating mechanism 13.

Next, contactless power transmission rotating mechanism 13 will be described in order from a shaft side.

Figure 2:
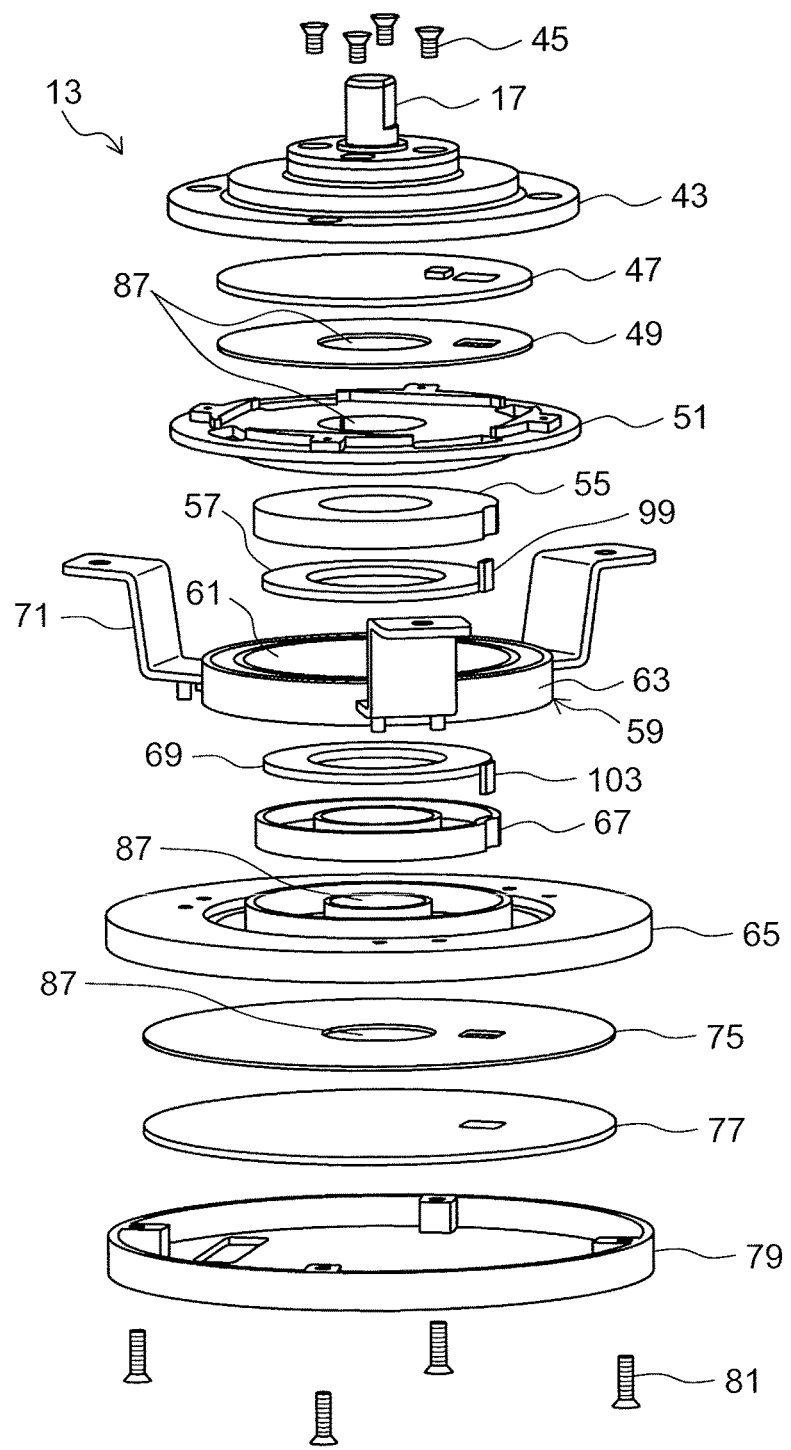
FIG. 2 is an exploded perspective view of a contactless power transmission rotating mechanism illustrated in FIG. 1.
Figure 3:
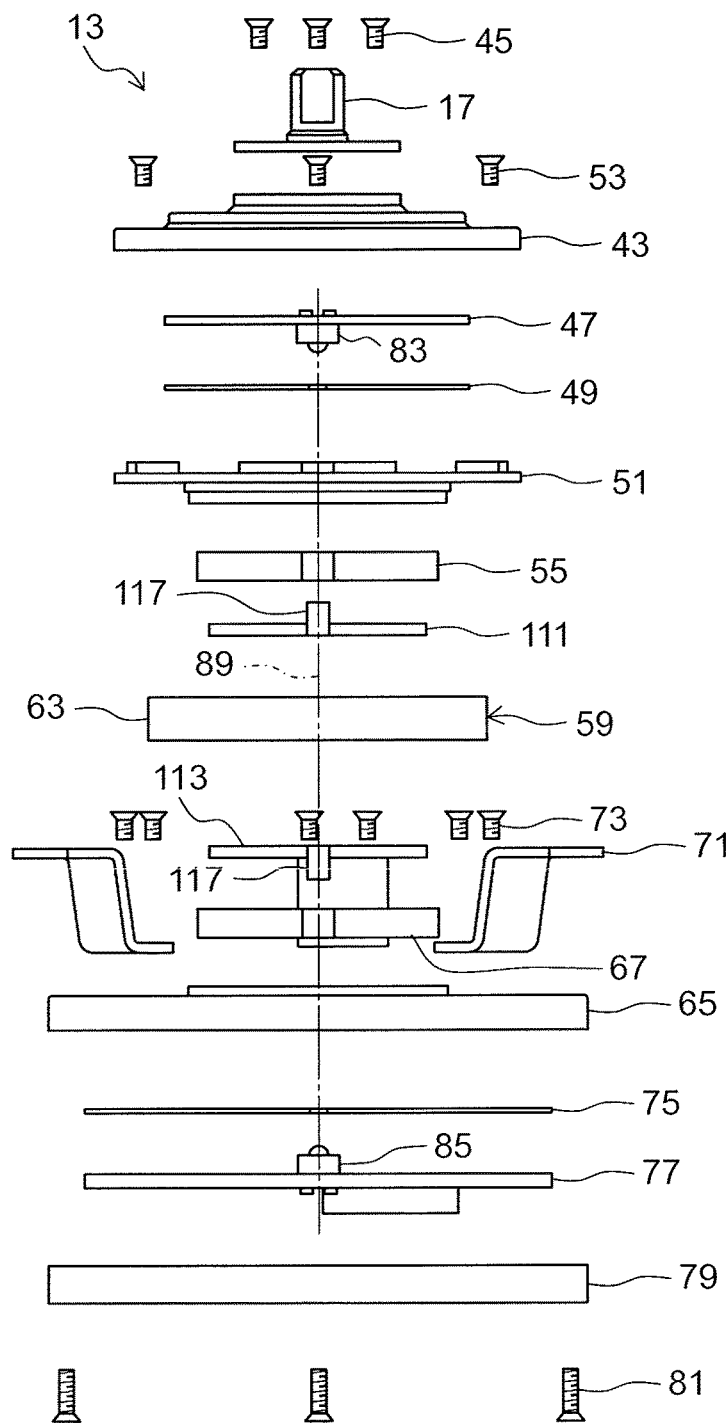
FIG. 3 is an exploded side view of the contactless power transmission rotating mechanism illustrated in FIG. 1.

FIG. 2 is an exploded perspective view of contactless power transmission rotating mechanism 13 illustrated in FIG. 1. FIG. 3 is an exploded side view of contactless power transmission rotating mechanism 13 illustrated in FIG. 1. Shaft 17 is fixed to camera side flange cover 43 by shaft fixing screws 45. Camera side printed board 47 is disposed on a lower surface of camera side flange cover 43. Camera side insulating plate 49 is disposed on a lower surface side of camera side printed board 47. Camera side flange 51 as one example of a first plate is disposed on a lower surface side of camera side insulating plate 49. Camera side flange cover 43 and camera side flange 51 are fixed by flange fixing screws 53 and accommodate camera side printed board 47 and camera side insulating plate 49.

Camera side ferrite 55 as one example of a first ferrite is fixed to a lower surface of camera side flange 51. Power receiving coil 57 as one example of a first inductor is fixed to a lower surface of camera side ferrite 55. Power receiving coil 57 is configured as a roll by winding an insulated conductor a plurality of times.

Inner race 61 as one example of a first ring of radial bearing 59 is fixed to the lower surface of camera side flange 51. Camera side ferrite 55 and power receiving coil 57 are disposed inward of inner race 61. Outer race 63 as one example of a second ring of radial bearing 59 is fixed to device main body side flange 65 as one example of a second plate. That is, relative rotation is allowed between camera side flange 51 and device main body side flange 65 with radial bearing 59 interposed therebetween. Device main body side ferrite 67 as one example of a second ferrite is fixed to an upper surface of device main body side flange 65. Power transmitting coil 69 as one example of a second inductor is fixed to an upper surface of device main body side ferrite 67. Power transmitting coil 69 is disposed inward of inner race 61 to face power receiving coil 57. Power transmitting coil 69 is configured as a roll by winding an insulated conductor a plurality of times.

A plurality (three in the illustrated example) of Z angle irons 71 is fixed to device main body side flange 65 by angle iron fixing screw 73. Device main body side flange 65 is fixed to the main body base by Z angle irons 71. That is, contactless power transmission rotating mechanism 13 is fixed to the main body base with Z angle irons 71 interposed therebetween. Device main body side insulating plate 75 is disposed on a lower surface of device main body side flange 65. Device main body side printed board 77 is disposed on a lower surface of device main body side insulating plate 75. Device main body side flange cover 79 is disposed on a lower surface of device main body side printed board 77. Device main body side flange 65 and device main body side flange cover 79 are fixed by flange fixing screws 81 and accommodate device main body side insulating plate 75 and device main body side printed board 77.

As illustrated in FIG. 3, optical transmitter 83 is mounted on the lower surface side of camera side printed board 47. Optical receiver 85 is mounted on an upper surface side of device main body side printed board 77. Optical propagation path 89 is formed between optical receiver 85 and optical transmitter 83 by through holes 87 that are formed in above each member interposed between optical receiver 85 and optical transmitter 83. Monitoring camera 11, by optical transmitter 83 and optical receiver 85, contactlessly transmits and receives a camera control signal and image information (for example, image data) between device main body side printed board 77 and camera side printed board 47.

As described above, monitoring camera 11 according to the present exemplary embodiment includes radial bearing 59 that has inner race 61 and outer race 63, camera side flange 51 that is disposed on one side of radial bearing 59 and fixed to inner race 61, camera 25 that is disposed on a side of camera side flange 51, device main body side flange 65 that is disposed on another side of radial bearing 59 and fixed to outer race 63, power receiving coil 57 that is accommodated in camera side flange 51, and power transmitting coil 69 that faces power receiving coil 57 and is accommodated in device main body side flange 65.

Figure 4:
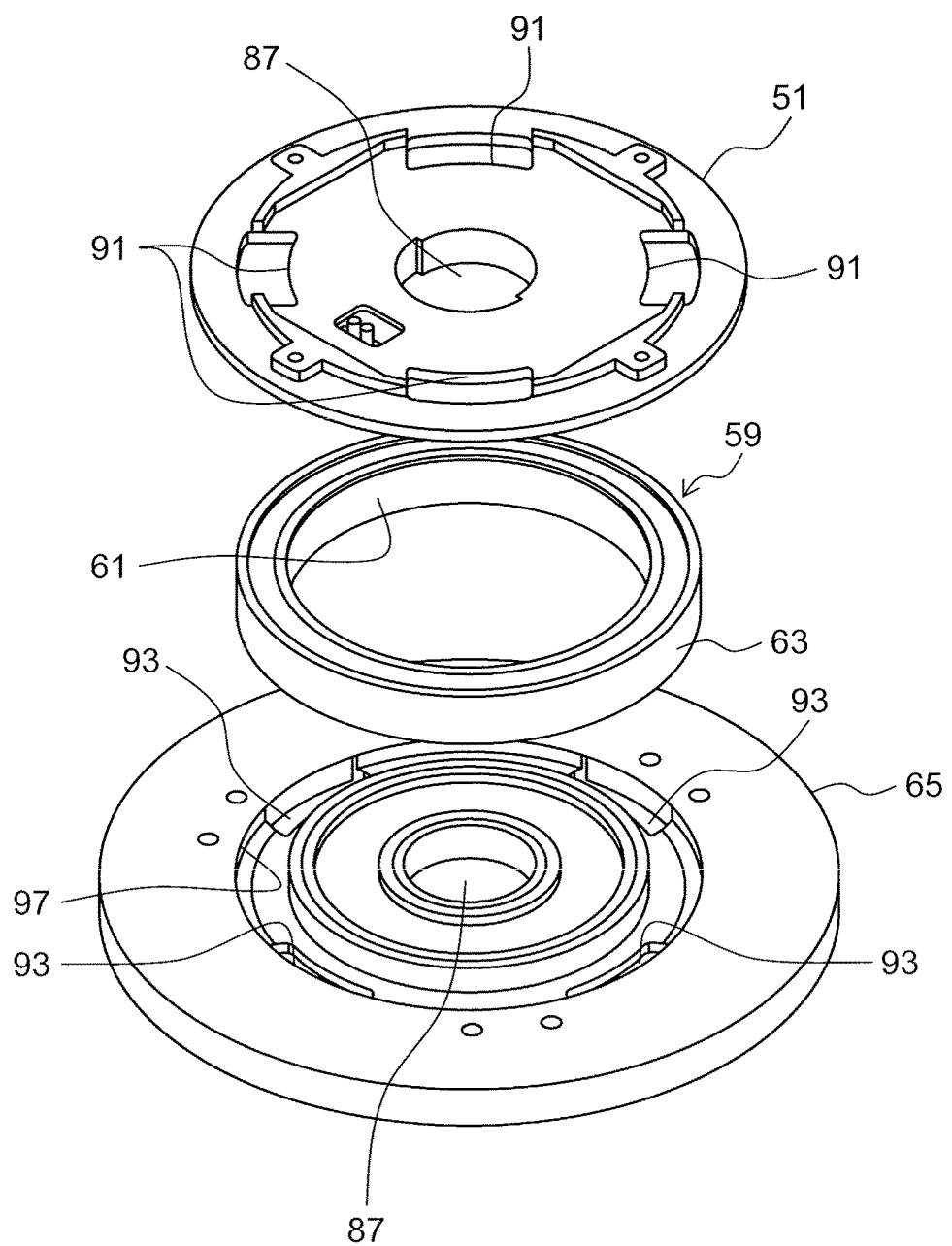
FIG. 4 is an exploded perspective view of a camera side flange, a radial bearing, and a device main body side flange.

FIG. 4 is an exploded perspective view of camera side flange 51, radial bearing 59, and device main body side flange 65. In monitoring camera 11, inner race openings 91 (four in number in the illustrated example) as one example of a first opening are disposed in positions corresponding to inner race 61 of camera side flange 51. In monitoring camera 11, outer race openings 93 (four in number in the illustrated example) as one example of a second opening are disposed in positions corresponding to outer race 63 of device main body side flange 65.

An inner circumference of inner race 61 of radial bearing 59 is fixedly pressed (that is, swaged) into projection portion outer circumferential wall 95 (refer to FIG. 6) that is disposed as a protrusion on the lower surface of camera side flange 51. An outer circumference of outer race 63 of radial bearing 59 is fixedly pressed (that is, swaged) into recess portion inner circumferential wall 97 (refer to FIG. 7) that is disposed as a recess on the upper surface of device main body side flange 65. Inner race openings 91 are bored through projection portion outer circumferential wall 95 in a direction along the center of rotation. Outer race openings 93 are bored through recess portion inner circumferential wall 97 in a direction along the center of rotation. That is, projection portion outer circumferential wall 95 is removed in parts where inner race openings 91 are bored. Recess portion inner circumferential wall 97 is removed in parts where outer race openings 93 are bored. It is preferable that three or more inner race openings 91 and three or more outer race openings 93 be formed equidistantly in a circumferential direction. In the present exemplary embodiment, four inner race openings 91 and four outer race openings 93 are equidistantly disposed.

Inner race openings 91 are used at the time of swaging inner race 61 into projection portion outer circumferential wall 95 and visually recognizing the state of swaging. Outer race openings 93 are used at the time of swaging outer race 63 into recess portion inner circumferential wall 97 and visually recognizing the state of swaging. By disposing three or more inner race openings 91 and three or more outer race openings 93 equidistantly in the circumferential direction, inner race 61 and outer race 63 can be pressed with even pressing force in the circumferential direction.

Figure 5:
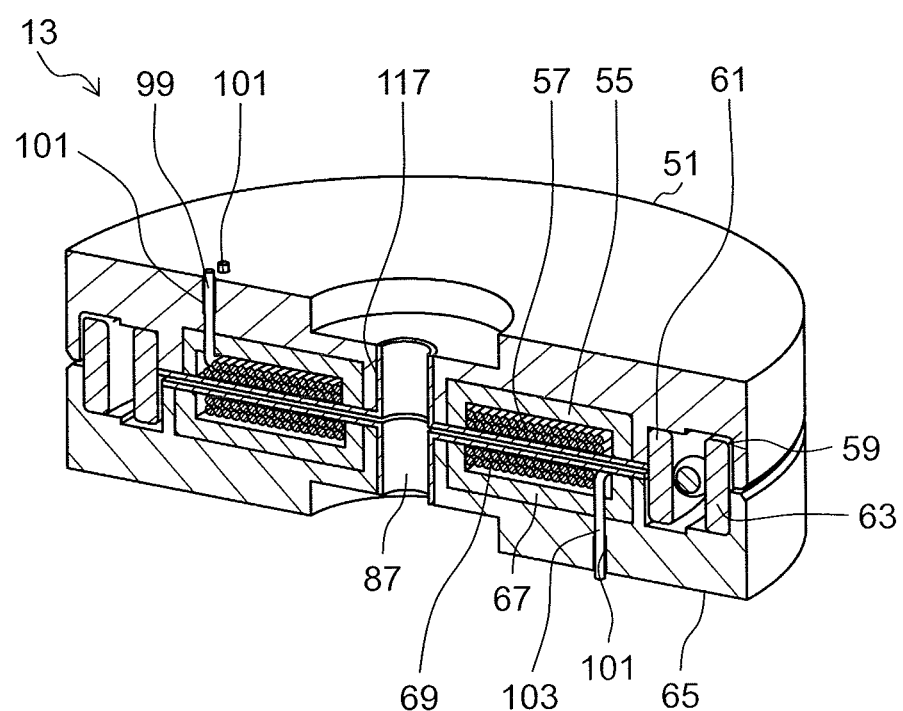
FIG. 5 is a cutaway schematic view of the contactless power transmission rotating mechanism.

FIG. 5 is a cutaway schematic view of contactless power transmission rotating mechanism 13. FIG. 5 to FIG. 8 are schematic diagrams conceptually representing a main portion of contactless power transmission rotating mechanism 13. In monitoring camera 11, as described above, the first ring is inner race 61 of radial bearing 59, and the second ring is outer race 63 of radial bearing 59. Device main body side flange 65 fixes outer race 63 to recess portion inner circumferential wall 97 and is supported by the main body base with Z angle irons 71 interposed therebetween (refer to FIG. 1). Camera side flange 51 is rotatably supported by device main body side flange 65 with radial bearing 59 interposed therebetween, and shaft 17 (refer to FIG. 1) is fixed.

In contactless power transmission rotating mechanism 13, power receiving coil 57 is fixed to camera side flange 51 with camera side ferrite 55 interposed therebetween, and power transmitting coil 69 is fixed to device main body side flange 65 with device main body side ferrite 67 interposed therebetween. Camera side flange 51, camera side ferrite 55, power receiving coil 57, power transmitting coil 69, device main body side ferrite 67, and device main body side flange 65 are disposed coaxially with a center of rotation of contactless power transmission rotating mechanism 13.

Figure 6:
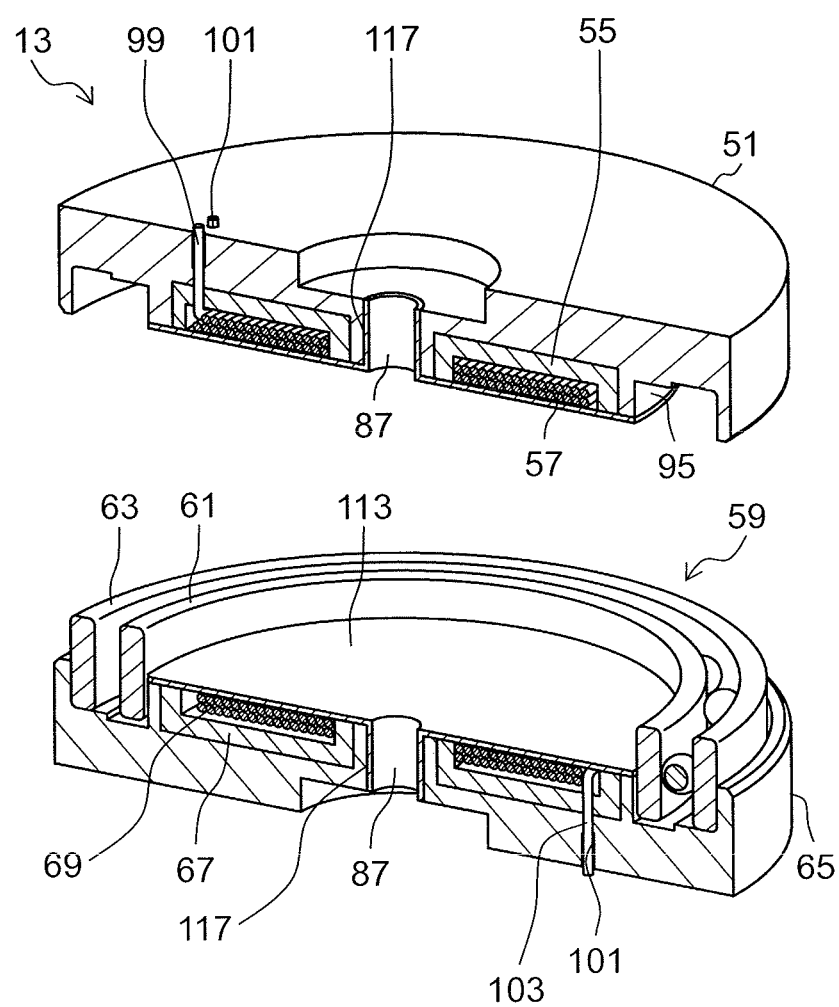
FIG. 6 is a schematic diagram separating a camera side flange side and a device main body side flange side of FIG. 5.

FIG. 6 is a schematic diagram separating a camera side flange 51 side and a device main body side flange 65 side of FIG. 5. In monitoring camera 11, holes 101 through which power reception side terminal 99 of power receiving coil 57 passes are disposed in camera side flange 51 and camera side ferrite 55. Holes 101 through which power transmission side terminal 103 of power transmitting coil 69 passes are disposed in device main body side flange 65 and device main body side ferrite 67. In power receiving coil 57, power reception side terminal 99 passing through holes 101 is connected to camera side printed board 47 in a wired manner. In power transmitting coil 69, power transmission side terminal 103 passing through holes 101 is connected to device main body side printed board 77 in a wired manner.

Figure 7:
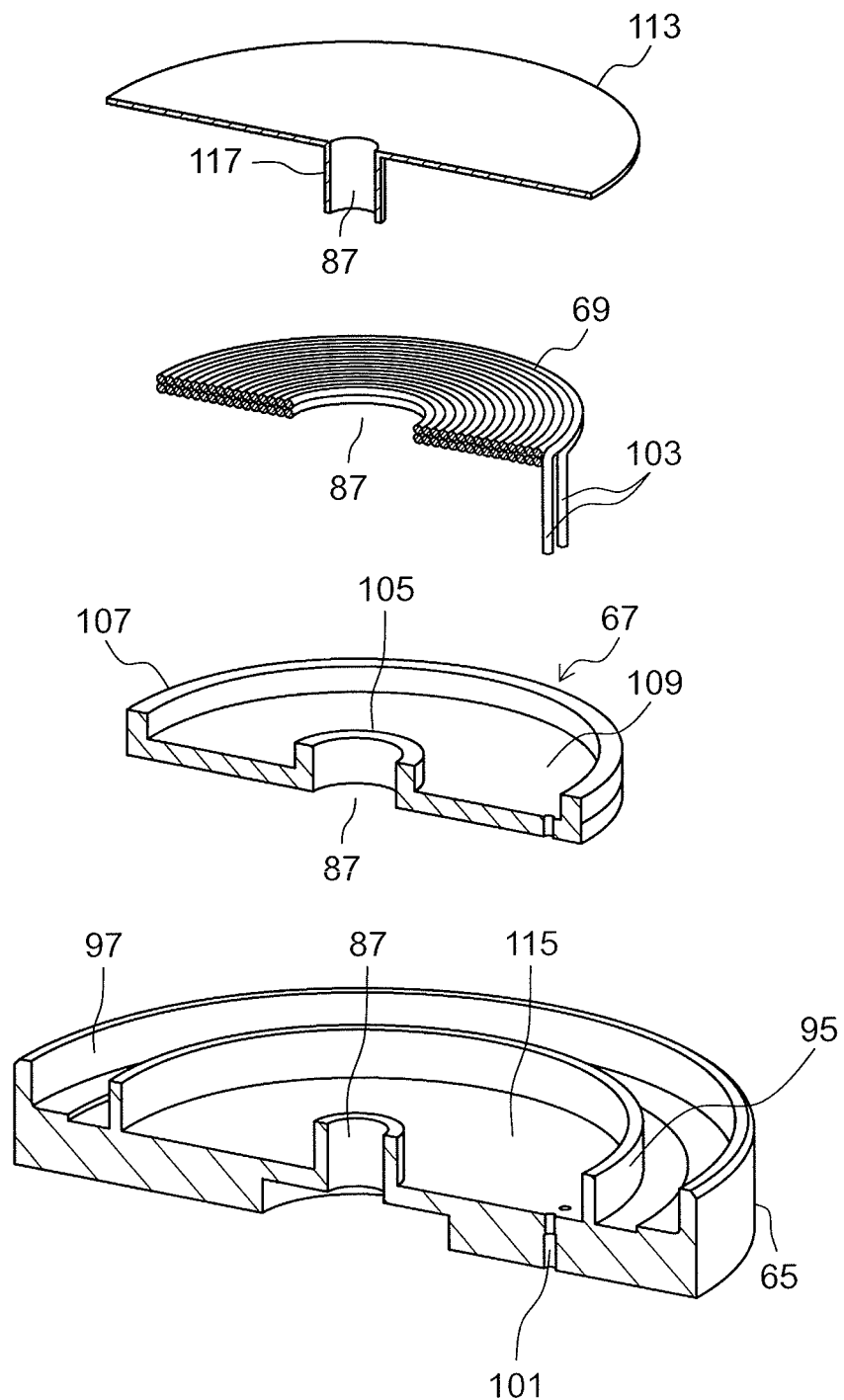
FIG. 7 is an exploded schematic view of the device main body side flange side of FIG. 6.

FIG. 7 is an exploded schematic view of the device main body side flange 65 side of FIG. 6. Monitoring camera 11 includes camera side ferrite 55 that is disposed between power receiving coil 57 and camera side flange 51, and device main body side ferrite 67 that is disposed between power transmitting coil 69 and device main body side flange 65. Camera side ferrite 55 and device main body side ferrite 67 are the same as each other. Accordingly, camera side ferrite 55 and device main body side ferrite 67 can have the same components. In addition, power receiving coil 57 and power transmitting coil 69 accommodated in camera side ferrite 55 and device main body side ferrite 67 are the same as each other. Accordingly, power receiving coil 57 and power transmitting coil 69 can have the same components.

Camera side ferrite 55 and device main body side ferrite 67 are formed in annular shapes, and inner circumferential walls 105 and outer circumferential walls 107 stand along outer circumferences and inner circumferences of camera side ferrite 55 and device main body side ferrite 67. That is, camera side ferrite 55 and device main body side ferrite 67 are formed in sectional U shapes of which the section in a radius direction is open upward. Camera side ferrite 55 and device main body side ferrite 67 accommodate power receiving coil 57 or power transmitting coil 69 in respective annular accommodation spaces 109 thereof interposed between inner circumferential wall 105 and outer circumferential wall 107 of each other.

Monitoring camera 11 includes camera side cover 111 that covers power receiving coil 57 and is fixed to camera side flange 51, and device main body side cover 113 that covers power transmitting coil 69 and is fixed to device main body side flange 65. Camera side cover 111 and device main body side cover 113 are the same as each other. Accordingly, camera side cover 111 and device main body side cover 113 can have the same components. In camera side flange 51 and device main body side flange 65, an inner side of projection portion outer circumferential wall 95 in the radius direction is annular ferrite accommodation space 115. Camera side ferrite 55 accommodating power receiving coil 57 or device main body side ferrite 67 accommodating power transmitting coil 69 is fixed in ferrite accommodation space 115. Camera side cover 111 and device main body side cover 113 cover power receiving coil 57 and power transmitting coil 69 for each of camera side ferrite 55 and device main body side ferrite 67. That is, camera side cover 111 and device main body side cover 113 close annular ferrite accommodation space 115 in an airtight manner.

Through holes 87 are bored in central portions of camera side cover 111 and device main body side cover 113. Cylinder 117 is formed on peripheries of through holes 87 along the center of rotation. An internal space of cylinder 117 is optical propagation path 89 of optical transmitter 83 and optical receiver 85. That is, optical propagation path 89 is secured through camera side flange 51, camera side ferrite 55, power receiving coil 57, camera side cover 111, device main body side cover 113, power transmitting coil 69, device main body side ferrite 67, and device main body side flange 65. Optical propagation path 89 matches the center of rotation of radial bearing 59. Monitoring camera 11, by including radial bearing 59, can align the center of rotation of contactless power transmission rotating mechanism 13 and optical propagation path 89 with high accuracy.

Figure 8:
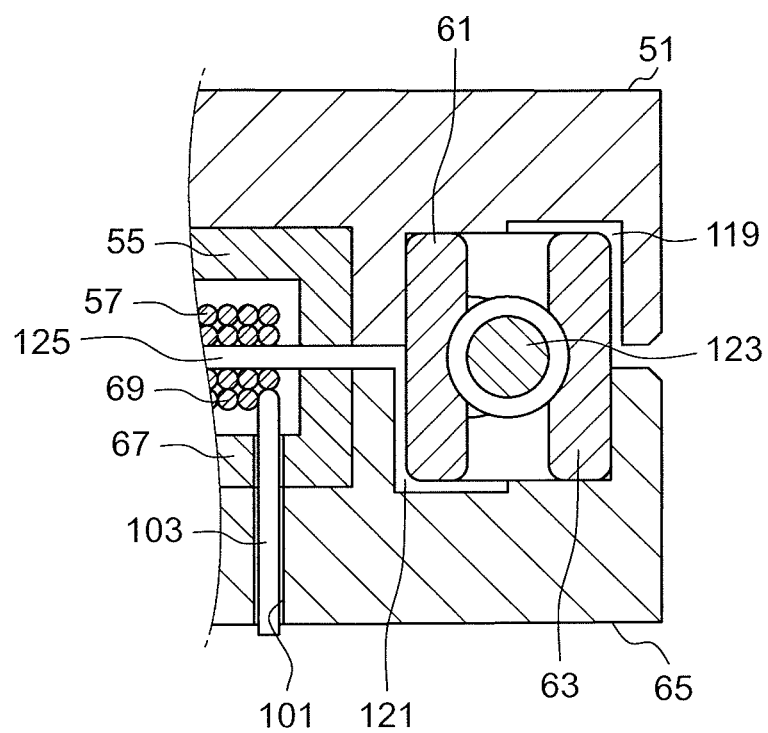
FIG. 8 is an enlarged view of a main portion of FIG. 5.

FIG. 8 is an enlarged view of a main portion of FIG. 5. In monitoring camera 11, camera side flange 51 has camera side space 119 as one example of a first space between camera side flange 51 and outer race 63. Camera side space 119 prevents camera side flange 51 from being in contact with outer race 63. In monitoring camera 11, device main body side flange 65 has device main body side space 121 as one example of a second space between device main body side flange 65 and inner race 61. Device main body side space 121 prevents device main body side flange 65 from being in contact with inner race 61. Accordingly, camera side flange 51 and device main body side flange 65 are in rotational contact with each other with only rolling elements of radial bearing 59 (for example, balls 123) interposed therebetween.

In addition, in monitoring camera 11, a space (that is, coil facing gap 125) is disposed between power receiving coil 57 as one example of the first inductor stored in camera side flange 51 and power transmitting coil 69 as one example of the second inductor stored in device main body side flange 65. More specifically, coil facing gap 125 is disposed between camera side cover 111 (refer to FIG. 3) covering power receiving coil 57 and device main body side cover 113 (refer to FIG. 3) covering power transmitting coil 69. That is, power receiving coil 57 and power transmitting coil 69 are covered with camera side cover 111 and device main body side cover 113 and arranged to face each other contactlessly.

Next, an action of above monitoring camera 11 of the present exemplary embodiment will be described.

Figure 9:
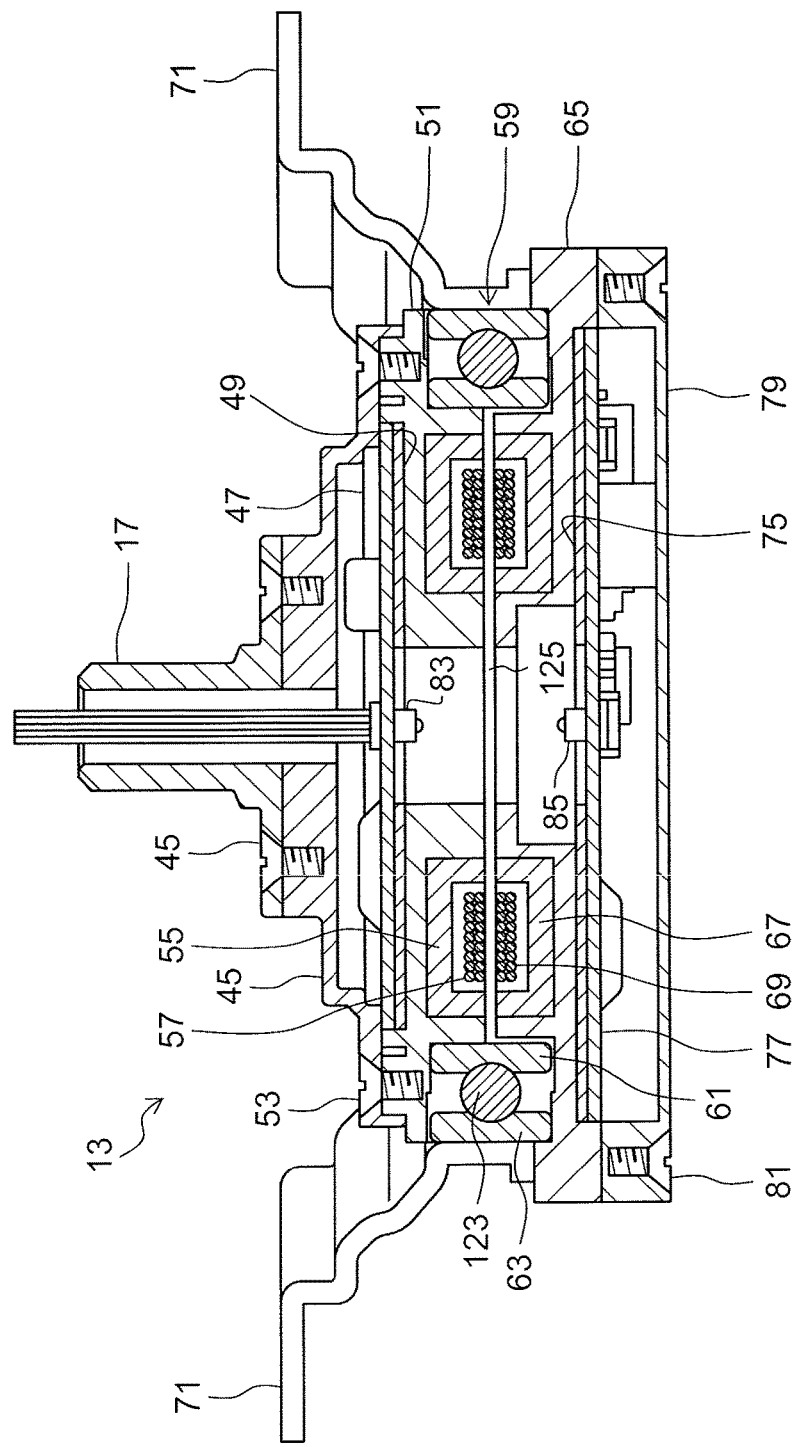
FIG. 9 is a sectional view configured of a plane including an axial center of the contactless power transmission rotating mechanism.

FIG. 9 is a sectional view configured of a plane including an axial center of contactless power transmission rotating mechanism 13. In monitoring camera 11 according to the present exemplary embodiment, camera side flange 51 disposed at inner race 61 of radial bearing 59 and device main body side flange 65 disposed at outer race 63 of radial bearing 59 are supported in a manner allowing relative rotation therebetween. Camera 25 is disposed at camera side flange 51. In addition, power receiving coil 57 is disposed in camera side flange 51. Power transmitting coil 69 is disposed to face power receiving coil 57 in device main body side flange 65.

Accordingly, power receiving coil 57 and power transmitting coil 69 are disposed to face each other in a manner allowing relative rotation therebetween. Power receiving coil 57 is a power reception side. Power transmitting coil 69 is a power transmission side. In monitoring camera 11, power transfer is contactlessly performed through coil facing gap 125 by using an action of electromagnetic induction between power transmitting coil 69 and power receiving coil 57, from device main body side flange 65 on the power transmission side as the device main body side to camera 25 disposed at camera side flange 51 on the power reception side.

That is, camera 25 and a device main body portion of monitoring camera 11 are made rotatable by contactless power transmission rotating mechanism 13. Accordingly, reliability of power transfer is improved, and a problem of a limited number of movements due to a mechanical contact is resolved.

In addition, radial bearing 59 has inner race 61 and outer race 63. Radial bearing 59 can be used as a rolling bearing that includes inner race 61 and outer race 63 as races. The rolling bearing is configured of races, rolling elements (balls 123 or rollers), and a cage. Above radial bearing 59 including inner race 61 and outer race 63 has almost no sliding friction and has mostly rotational friction, compared with a general sliding bearing that is in contact on a surface thereof. The rolling bearing has a friction power that is only 15% or lower of a friction power of the sliding bearing and thus can significantly improve a mechanical efficiency of power transmission in rotating unit 15.

Accordingly, in monitoring camera 11, power can be contactlessly transferred to camera 25 with power transmitting coil 69 and power receiving coil 57 supported with low friction and high accuracy in a manner allowing relative rotation therebetween.

In addition, in monitoring camera 11, in the case of camera side flange 51 and device main body side flange 65 being made of metal, a magnetic field of power transmitting coil 69 affects the metal and generates an eddy current in the metal, thereby causing the metal to heat. Consequently, unnecessary energy for other than power transfer is wasted, and the efficiency of power transfer is decreased. Therefore, device main body side ferrite 67 and camera side ferrite 55 are disposed between the metal and power transmitting coil 69, and the magnetic field flows along the ferrite. Consequently, unnecessary magnetic fields in a non power transmission direction are reduced, and a decrease in the efficiency of power transfer is reduced.

In addition, in monitoring camera 11, power receiving coil 57 is covered with camera side cover 111, and power transmitting coil 69 is covered with device main body side cover 113. Thus, insulating properties of power receiving coil 57 and power transmitting coil 69 are secured. Since relative rotation is allowed between power receiving coil 57 and power transmitting coil 69, covering power receiving coil 57 and power transmitting coil 69 with camera side cover 111 (refer to FIG. 3) and device main body side cover 113 (refer to FIG. 3) effectively protects power receiving coil 57 and power transmitting coil 69 from scratches or damages even if a foreign object intrudes between power receiving coil 57 and power transmitting coil 69. Accordingly, reliability of contactless power transmission rotating mechanism 13 is improved.

In addition, in monitoring camera 11, holes 101 through which power reception side terminal 99 of power receiving coil 57 passes are disposed in camera side flange 51 and camera side ferrite 55. Thus, power receiving coil 57 other than holes 101 can be shielded and covered from camera side flange 51. Accordingly, generation of an eddy current is effectively reduced. In addition, power reception side terminal 99 is inserted through holes 101 bored in camera side flange 51 and camera side ferrite 55. Thus, power reception side terminal 99 can be drawn to a rear surface side of camera side ferrite 55 (an opposite side of camera side flange 51 from camera side ferrite 55) at the shortest distance. Holes 101 that are bored in device main body side flange 65 and device main body side ferrite 67 and through which power transmission side terminal 103 passes accomplish the same action.

In addition, in monitoring camera 11, using radial bearing 59 as a bearing increases strength against load in a direction perpendicular to the axial center (radial load). This case is suitable for an operating form (for example, attaching on a wall) of monitoring camera 11 in which, for example, a direction of the center of rotation intersects with the vertical axis. Monitoring camera 11 that includes radial bearing 59 in contactless power transmission rotating mechanism 13 can rotatably support camera 25 with low friction. Thus, energy (power consumption) for rotational driving of camera 25 is reduced.

In addition, contactless power transmission rotating mechanism 13 can use an angular contact ball bearing that is categorized as radial bearing 59. The angular contact ball bearing can receive not only radial thrust but also unidirectional load (thrust load) along the axial center. Arranging two or more of the angular contact ball bearings in a facing manner in a back-to-back arrangement or a face-to-face arrangement can bear bidirectional thrust load in one direction and another direction. In this case, monitoring camera 11 is suitable for an operating form (for example, attaching on a ceiling or installing on a horizontal surface) in which, for example, the direction of the center of rotation is along the vertical axis.

In addition, in monitoring camera 11, camera side flange 51 that is fixed to inner race 61 and integrally rotates is separated from device main body side flange 65 by camera side space 119 (refer to FIG. 8), and camera side flange 51 does not interfere with outer race 63. In addition, device main body side flange 65 fixed to outer race 63 is separated from inner race 61 by device main body side space 121 (refer to FIG. 8), and device main body side flange 65 does not interfere with inner race 61. Accordingly, relative rotation is allowed between camera side flange 51 and device main body side flange 65 with radial bearing 59 interposed therebetween, and camera side flange 51 and device main body side flange 65 are smoothly (with low friction) supported.

In addition, in monitoring camera 11, camera side flange 51 is supported by inner race 61 of radial bearing 59, and camera 25 is supported by camera side flange 51. Accordingly, outer race 63 of radial bearing 59 is fixed to device main body side flange 65 as the device main body side. Accordingly, inner race 61 having a small diameter is a rotating side, and load on the rotating side (rotating unit side) can be reduced.

Figure 10:
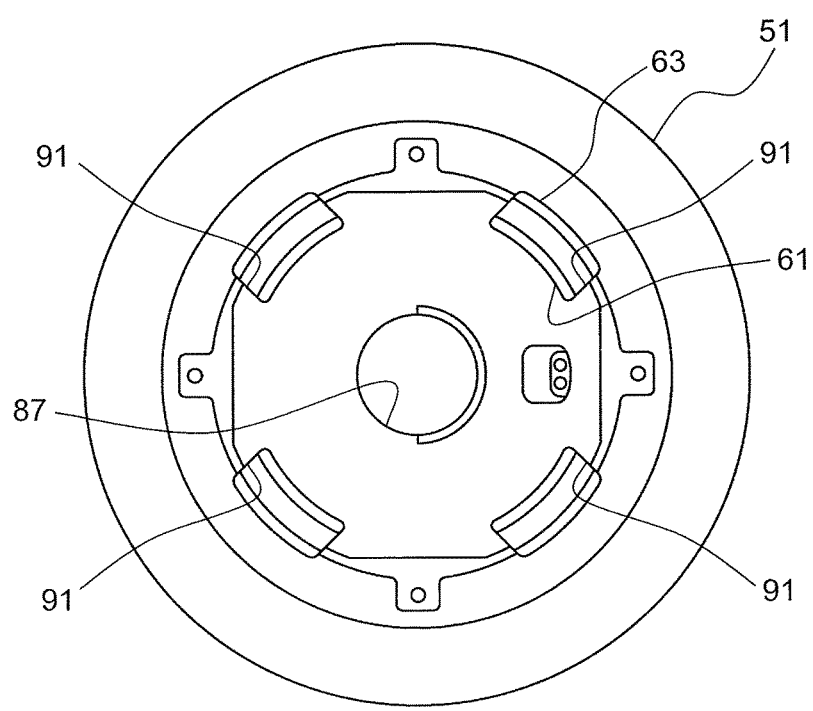
FIG. 10 is a plan view when the bearing is seen from an outer side of the camera side flange.
Figure 11:
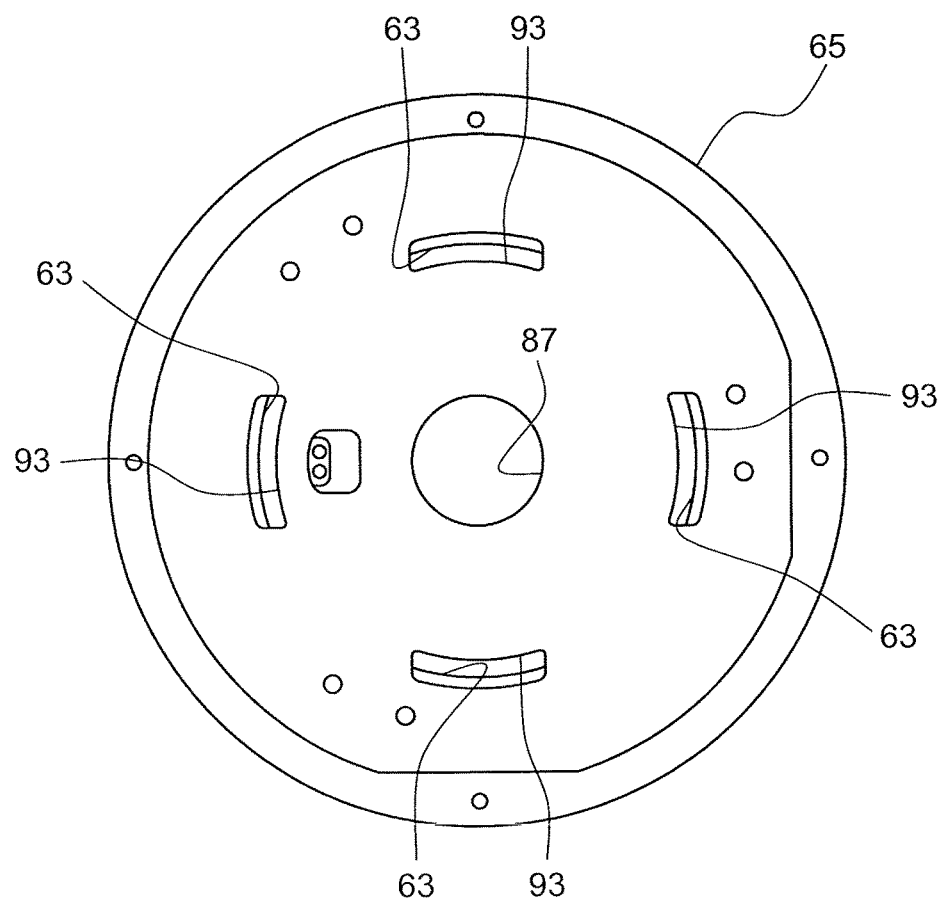
FIG. 11 is a plan view when the bearing is seen from an outer side of the device main body side flange.

FIG. 10 is a plan view when the bearing is seen from an outer side of camera side flange 51. FIG. 11 is a plan view when the bearing is seen from an outer side of device main body side flange 65. In monitoring camera 11, radial bearing 59 is disposed to be interposed between camera side flange 51 and device main body side flange 65 and thus is not seen from the outer side of camera side flange 51 nor from the outer side of device main body side flange 65.

Therefore, inner race opening 91 bored in camera side flange 51 enables visual recognition of inner race 61 fixed to camera side flange 51. In addition, outer race opening 93 bored in device main body side flange 65 enables visual recognition of outer race 63 fixed to device main body side flange 65. Inner race openings 91 and outer race openings 93 can also be used as openings for fixing and unfixing inner race 61 and camera side flange 51 and outer race 63 and device main body side flange 65. Accordingly, monitoring camera 11, by inner race openings 91 and outer race openings 93, can facilitate, with the minimum area of boring required, attachment of radial bearing 59 interposed and hidden between camera side flange 51 and device main body side flange 65 and verification of the attachment.

In addition, in monitoring camera 11, coil facing gap 125 (refer to FIG. 9) is disposed between power receiving coil 57 stored in camera side flange 51 and power transmitting coil 69 stored in device main body side flange 65. Thus, monitoring camera 11 can prevent interference due to a direct contact between power receiving coil 57 and power transmitting coil 69 in relative rotation. In addition, even if a foreign object intrudes between the coils, scratches or damages are unlikely to be generated in power receiving coil 57 and power transmitting coil 69. Accordingly, reliability of contactless power transmission rotating mechanism 13 is improved.

SECOND EXEMPLARY EMBODIMENT

Next, monitoring camera 11 of a second exemplary embodiment will be described.

Figure 12:
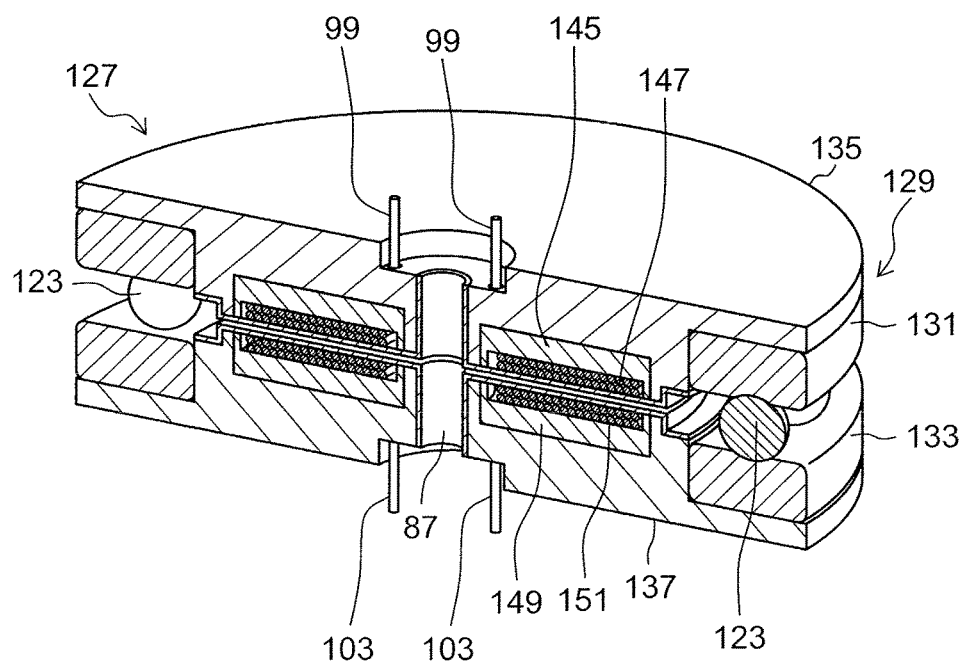
FIG. 12 is a schematic view of a contactless power transmission rotating mechanism of an imaging device according to a second exemplary embodiment.
Figure 13:
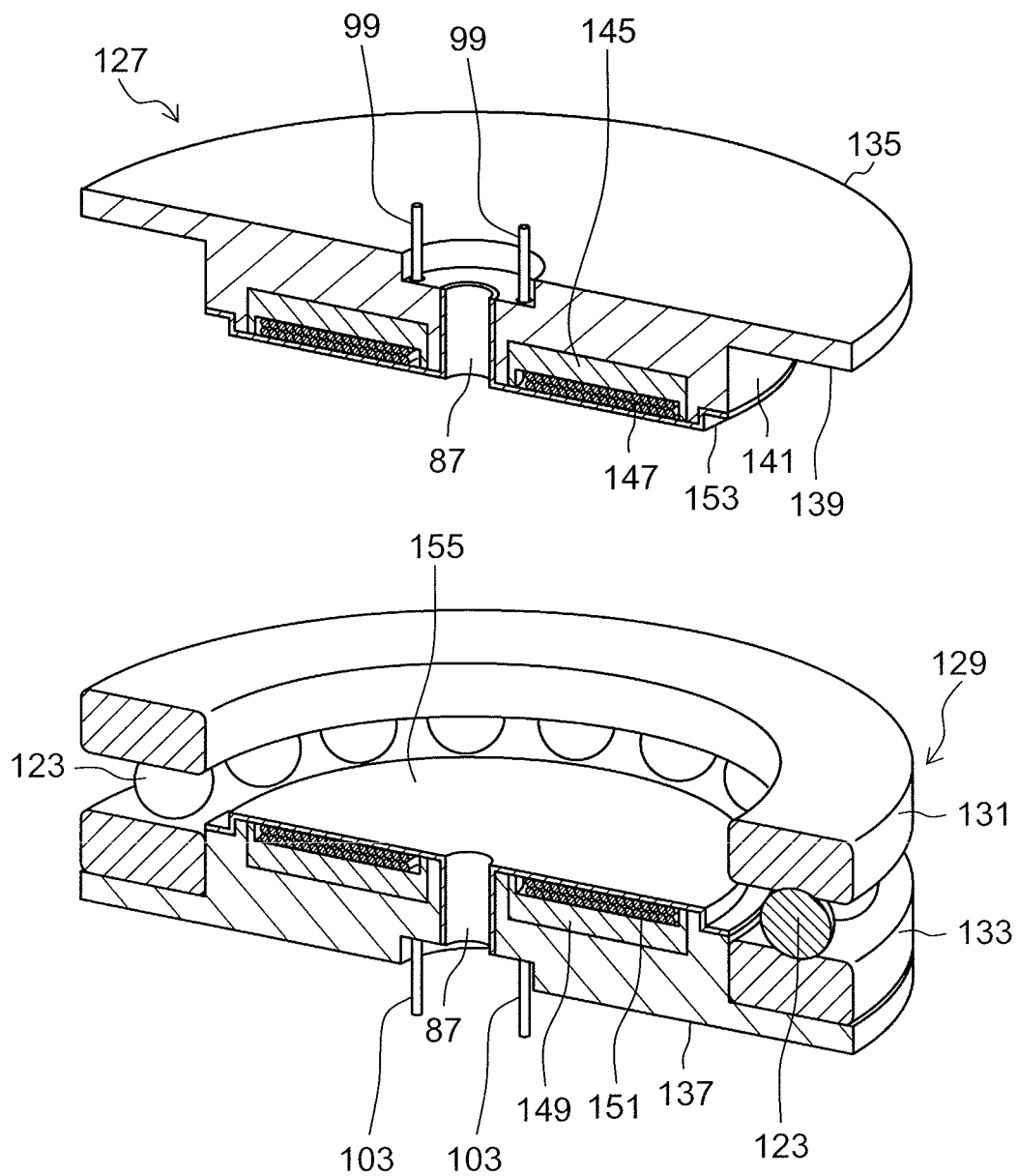
FIG. 13 is a schematic diagram separating a camera side flange side and a device main body side flange side of FIG. 12.
Figure 14:
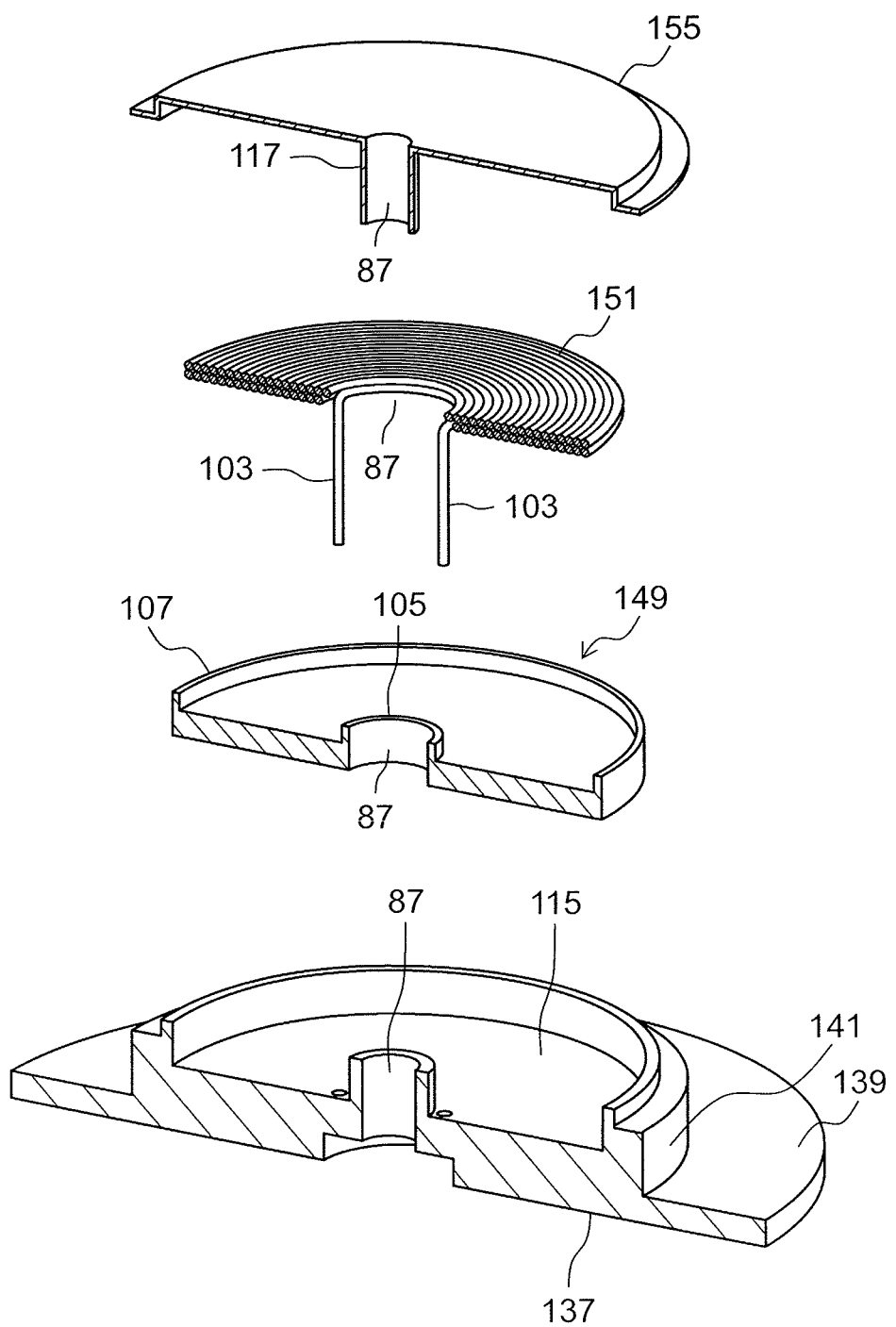
FIG. 14 is an exploded schematic view of the device main body side flange side of FIG. 13.

FIG. 12 is a schematic view of contactless power transmission rotating mechanism 127 of monitoring camera 11 according to the second exemplary embodiment. FIG. 13 is a schematic diagram separating a camera side flange 135 side and a device main body side flange 137 side of FIG. 12. FIG. 14 is an exploded schematic view of the device main body side flange 137 side of FIG. 13. The same configurations as the members or parts illustrated in FIG. 1 to FIG. 11 will be designated by the same reference signs, and duplicate descriptions thereof will not be provided.

In monitoring camera 11 according to the second exemplary embodiment, contactless power transmission rotating mechanism 127 has a different bearing from contactless power transmission rotating mechanism 13 of the first exemplary embodiment. That is, the bearing of contactless power transmission rotating mechanism 127 of monitoring camera 11 according to the second exemplary embodiment is thrust bearing 129. Other configurations are the same as in the first exemplary embodiment.

Thrust bearing 129, compared with radial bearing 59 of the first exemplary embodiment, can be said to have inner race 131 on a shaft side (that is, a camera 25 side) and outer race 133 on a housing side (device main body side). Inner race 131 and outer race 133 can be formed in a washer shape and have the same inside diameter and outside diameter. Rolling elements (balls 123) are disposed between inner race 131 and outer race 133. Camera side flange 135 and device main body side flange 137 of contactless power transmission rotating mechanism 127 can have the same shape of fitting portions for inner race 131 and outer race 133. That is, annular seat units 139 that are in contact with both end surfaces in an axis line direction of inner race 131 and outer race 133 are formed in camera side flange 135 and device main body side flange 137. In addition, flat circular column units 141 that fit on inner circumferences of inner race 131 and outer race 133 are disposed as protrusions in camera side flange 135 and device main body side flange 137.

Ferrite accommodation spaces 115 that accommodate camera side ferrite 145 and device main body side ferrite 149 are disposed as recesses in flat circular column units 141 of each of camera side flange 135 and device main body side flange 137. Camera side ferrite 145, power receiving coil 147, device main body side ferrite 149, and power transmitting coil 151 are fixed in each ferrite accommodation space 115. In addition, ferrite accommodation spaces 115 of each of camera side flange 135 and device main body side flange 137 are closed by camera side cover 153 and device main body side cover 155 in an airtight manner.

Next, an action of monitoring camera 11 of the second exemplary embodiment will be described.

In monitoring camera 11 of the second exemplary embodiment, camera side flange 135 disposed at inner race 131 of thrust bearing 129 and device main body side flange 137 disposed at outer race 133 of thrust bearing 129 are supported in a manner allowing relative rotation therebetween. Camera 25 (refer to FIG. 1) is disposed at camera side flange 135. In addition, power receiving coil 147 is disposed in camera side flange 135. Power transmitting coil 151 is disposed to face power receiving coil 147 in device main body side flange 137.

Power receiving coil 147 and power transmitting coil 151 are disposed to face each other in a manner allowing relative rotation therebetween. In the monitoring camera, in the same manner as the above configuration, power transfer is contactlessly performed by using an action of electromagnetic induction between power transmitting coil 151 and power receiving coil 147, from device main body side flange 137 on the power transmission side as the device main body side to camera 25 disposed in camera side flange 135 on the power reception side. Accordingly, reliability of power transfer is improved, and a problem of a limited number of movements due to a mechanical contact is resolved.

In addition, in monitoring camera 11 according to the second exemplary embodiment, using thrust bearing 129 as the bearing increases strength against load in a direction along the axial center (thrust load). Thrust bearing 129 can receive unidirectional thrust load. This case is suitable for an operating form (for example, installing on a horizontal surface) of monitoring camera 11 in which, for example, monitoring camera 11 has the center of rotation in a direction along the vertical axis and, since being a heavy object, has downward load. Contactless power transmission rotating mechanism 127 including thrust bearing 129 enables rotational support with low friction. Thus, energy (power consumption) for rotational driving of camera 25 is reduced.

In addition, contactless power transmission rotating mechanism 127 enables easy separation of inner race 131 and outer race 133 of thrust bearing 129. In contactless power transmission rotating mechanism 127, camera side cover 153 on a side where camera 25 is attached is supported by inner race 131, and outer race 133 supports device main body side cover 155. Accordingly, camera 25 disposed on an inner race side can be easily separated from the device main body.

Accordingly, according to monitoring camera 11 according to above each exemplary embodiment, a problem of a limited number of movements due to a mechanical contact can be resolved. Furthermore, power transmitting coil 69 (power transmitting coil 151) and power receiving coil 57 (power receiving coil 147), with a gap allowing power transmission interposed therebetween (that is, coil facing gap 125), can be supported in a manner allowing relative rotation therebetween.

While various exemplary embodiments are described thus far with reference to the drawings, the present disclosure is obviously not limited to such examples. Those skilled in the art may apparently perceive, within the scope disclosed in the claims, various modification examples or correction examples which are obviously understood to fall under the technical scope of the present disclosure.

What is claimed is:

1. An imaging device comprising:
   a bearing that has a first ring and a second ring;
   a first plate that is disposed on one side of the bearing and fixed to the first ring;
   an imaging unit that is disposed on a side of the first plate;
   a second plate that is disposed on another side of the bearing and fixed to the second ring;
   a first inductor that is accommodated in the first plate; and
   a second inductor that faces the first inductor and is accommodated in the second plate.

2. The imaging device of claim 1, further comprising:
   a first ferrite that is disposed between the first inductor and the first plate; and
   a second ferrite that is disposed between the second inductor and the second plate.

3. The imaging device of claim 2, further comprising:
   a first cover that covers the first inductor and is fixed to the first plate; and a second cover that covers the second inductor and is fixed to the second plate.

4. The imaging device of claim 2, further comprising:
wherein holes through which a terminal of the first inductor passes are disposed in the first plate and the first ferrite, and
holes through which a terminal of the second inductor passes are disposed in the second plate and the second ferrite.

5. The imaging device of claim 1, further comprising:
wherein the bearing is a radial bearing.

6. The imaging device of claim 5,
wherein a first space is disposed between the first plate and the second ring, and
a second space is disposed between the second plate and the first ring.

7. The imaging device of claim 5,
wherein the first ring is an inner race of the radial bearing, and
the second ring is an outer race of the radial bearing.

8. The imaging device of claim 1, further comprising:
wherein the bearing is a thrust bearing.

9. The imaging device of claim 1, further comprising:
wherein a first opening is disposed in a position corresponding to the first ring in the first plate, and
a second opening is disposed in a position corresponding to the second ring in the second plate.

10. The imaging device of claim 1, further comprising:
wherein a space is disposed between the first inductor stored in the first plate and the second inductor stored in the second plate.

* * * * *